United States Patent
Brunelle et al.

(10) Patent No.: US 7,557,174 B2
(45) Date of Patent: Jul. 7, 2009

(54) CARBOXY-TERMINATED OLIGOMERIC POLYESTER COMPOSITIONS AND METHOD FOR MAKING

(75) Inventors: Daniel Joseph Brunelle, Burnt Hills, NY (US); Martino Colonna, Bologna (IT); Corrado Berti, Ravenna (IT); Maurizio Fiorini, Bologna (IT); Enrico Binassi, Bologna (IT)

(73) Assignee: SABIC Innovative Plastics IP BV, Bergen op Zoom (NL)

( * ) Notice: Subject to any disclaimer, the term of this patent is extended or adjusted under 35 U.S.C. 154(b) by 13 days.

(21) Appl. No.: 11/528,206

(22) Filed: Sep. 27, 2006

(65) Prior Publication Data

US 2007/0027290 A1 Feb. 1, 2007

Related U.S. Application Data

(62) Division of application No. 10/999,025, filed on Nov. 29, 2004, now abandoned.

(51) Int. Cl.
 *C08G 63/00* (2006.01)
 *C08G 63/87* (2006.01)
 *C08F 20/00* (2006.01)
(52) U.S. Cl. ............ 528/181; 528/191; 528/194; 528/279; 528/280; 528/283; 528/302; 528/308; 528/308.6; 525/437; 524/783; 524/784
(58) Field of Classification Search ............... 528/181, 528/191, 194, 279, 280, 283, 302, 308, 308.6; 525/437; 524/783, 784
See application file for complete search history.

(56) References Cited

U.S. PATENT DOCUMENTS

| 3,553,167 | A | 1/1971 | Schnell et al. | |
| 3,972,852 | A | 8/1976 | Inata et al. | |
| 4,102,864 | A | 7/1978 | Deex et al. | |
| 4,436,894 | A | 3/1984 | Urasaki et al. | |
| 4,952,663 | A | 8/1990 | Cleary et al. | |
| 5,391,689 | A | 2/1995 | Kageyama et al. | |
| 6,538,065 | B1 | 3/2003 | Suriano et al. | 525/182 |
| 6,559,270 | B1 | 5/2003 | Siclovan et al. | 528/196 |
| 6,861,482 | B2 | 3/2005 | Brunelle et al. | 525/439 |

FOREIGN PATENT DOCUMENTS

EP 0 372 919 6/1990

*Primary Examiner*—Duc Truong

(57) ABSTRACT

The present invention provides carboxy-terminated oligomeric polyester compositions useful in the preparation of "weatherable" polymeric materials, for example weatherable copolyestercarbonates. In one aspect the present invention provides an oligomeric polyester composition comprising structural units derived from at least one diacid, at least one diaryl carbonate and at least one diol. The structural units derived from the diacid are present in a molar excess of from about 10% to about 40% based on a ratio of moles of diacid-derived structural units to moles of diol-derived structural units present in the oligomeric polyester composition. The oligomeric polyester composition is further characterized by the presence of at least some phenoxy end groups.

12 Claims, No Drawings

CARBOXY-TERMINATED OLIGOMERIC POLYESTER COMPOSITIONS AND METHOD FOR MAKING

This application is a division of application Ser. No. 10/999,025 filed Nov. 29, 2004 now abandoned.

BACKGROUND

This invention relates to carboxy-terminated oligomeric polyester compositions and methods for their preparation. Carboxy-terminated polyarylates are useful in the preparation of weatherable copolymer compositions such as copolyestercarbonates.

Various polymeric materials and articles comprising them, exhibit long-term color instability. In many cases, this instability is seen as yellowing of the polymer, thereby detracting from its attractiveness and transparency over time. Additionally, loss of gloss can also be an undesirable long-term phenomenon. Despite extensive research and development efforts towards improving the long-term stability of polymeric materials, long-term color instability and loss of gloss persist as significant limitations to the use of polymeric materials in a wide variety of applications.

It is of interest therefore, to develop new and more stable polymeric materials that overcome the limitations of known polymeric materials, which provide compositions that can be used to fabricate articles having long-term color and gloss stability.

BRIEF SUMMARY

The present invention provides carboxy-terminated oligomeric polyester compositions useful in the preparation of "weatherable" polymeric materials, for example weatherable copolyestercarbonates. In one aspect the present invention provides an oligomeric polyester composition comprising structural units derived from at least one diacid, at least one diaryl carbonate and at least one diol. The structural units derived from the diacid are present in a molar excess of from about 10% to about 40% based on a ratio of moles of diacid-derived structural units to moles of diol-derived structural units present in the oligomeric polyester composition. The oligomeric polyester composition is further characterized by the presence of at least some phenoxy end groups.

In one aspect the present invention provides an oligomeric polyester composition comprising structural units derived from at least one diacid, at least one diaryl carbonate and at least one diol. The structural units derived from the diacid are present in a molar excess of from about 10% to about 40% based on a ratio of moles of diacid-derived structural units to moles of diol-derived structural units present in the oligomeric polyester composition. The oligomeric polyester composition is further characterized by the presence of atleast some phenoxy end groups.

In another aspect the present invention provides a method for preparing a carboxy-terminated oligomeric polyester. The method comprises heating a reaction mixture comprising at least one catalyst, at least one diacid, at least one diol, and at least one diaryl carbonate, wherein said at least one diacid, and said at least one diol, are present in an amount corresponding to a molar ratio of diacid to diol, said molar ratio corresponding to from about 10% to about 40% excess diacid based on the amount of diol.

In another embodiment of the present invention there is provided a carboxy-terminated oligomeric polyester comprising structural units of formula X,

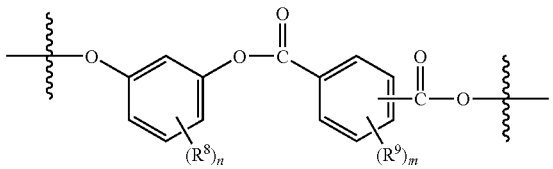

Formula (X)

wherein $R^8$ is independently at each occurrence a halogen atom, a nitro group, a cyano group, a $C_1$-$C_{20}$ aliphatic radical, a $C_3$-$C_{20}$ cycloaliphatic radical, or a $C_3$-$C_{20}$ aromatic radical; "n" is an integer from 0 to 4, $R^9$ is independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; and "m" is an integer from 0 to 4; the carboxy-terminated oligomeric polyester being characterized by a ratio of carboxy end-groups to a total number of end-groups, the ratio being greater than about 70 percent.

In accordance with another embodiment there is provided a composition comprising components A, B and optionally C. The component A comprises at least one carboxy-terminated oligomeric polyester comprising structural units having formula X,

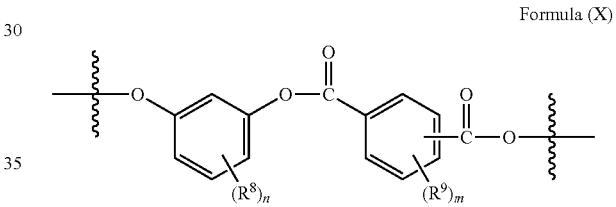

Formula (X)

wherein $R^8$ is independently at each occurrence a halogen atom, a nitro group, a cyano group, a $C_1$-$C_{20}$ aliphatic radical, a $C_3$-$C_{20}$ cycloaliphatic radical, or a $C_3$-$C_{20}$ aromatic radical; "n" is an integer from 0-4; $R^9$ is independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; and "m" is an integer from 0 to 4. The carboxy-terminated oligomeric polyester is characterized by a ratio of carboxy end-groups to a total number of hydroxy end-groups and carboxy end-groups. The ratio is greater than about 70 percent. The component B comprises at least one "organic species" comprising one or more functional groups, the functional groups being chemically reactive with the carboxy end-groups of the oligomeric polyester of component A. The optional component C comprises one or more catalysts, which promote a chemical reaction between the carboxy end-groups of the oligomeric polyester of component A and the "organic species" of component B. The carboxy-terminated oligomeric polyester comprising structural units having formula X is prepared by a method comprising, heating a reaction mixture having at least one catalyst, at least one diacid, at least one diol, and at least one diaryl carbonate. The at least one diacid and the at least one diol are present in the reaction mixture in an amount corresponding to a molar ratio of diacid to diol such that between about 10% and about 40% excess diacid is used based on the amount of diol employed in the reaction. The at least one diacid is selected from the group consisting of diacids represented by structural formulae IV and V

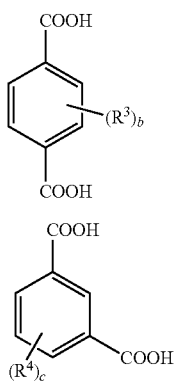

Formula IV

Formula V wherein $R^3$ and $R^4$ are independently at each occurrence a halogen atom, a nitro group, a cyano group, a $C_1$-$C_{12}$ aliphatic radical, a $C_3$-$C_{12}$ cycloaliphatic radical, or a $C_3$-$C_{20}$ aromatic radical; "b" is an integer from 0 to 4; and "c" is an integer from 0-4. The at least one diol is represented by structural formula XI,

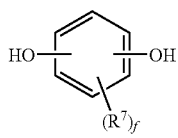

Formula XI wherein $R^7$ is independently at each occurrence a halogen atom, a nitro group, a cyano group, a $C_1$-$C_{14}$ aliphatic radical, a $C_4$-$C_{14}$ cycloaliphatic radical, or a $C_6$-$C_{14}$ aromatic radical; and "f" is an integer from 0 to 4. The diacid and diol are present in an amount corresponding to a molar ratio of diacid to diol in a range of from about 10% to about 40% excess diacid based on the amount of diol employed.

In accordance with another embodiment there is provided a composition comprising reaction products of components A, B and optionally C. The component A comprises at least one carboxy-terminated oligomeric polyester comprising structural units having formula X,

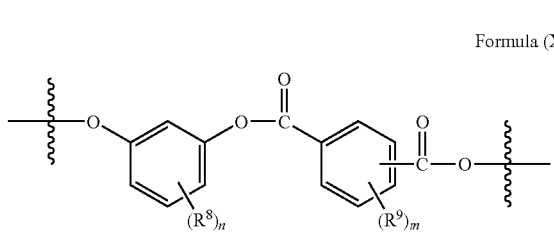

Formula (X)

wherein $R^8$ is independently at each occurrence a halogen atom, a nitro group, a cyano group, a $C_1$-$C_{20}$ aliphatic radical, a $C_3$-$C_{20}$ cycloaliphatic radical, or a $C_3$-$C_{20}$ aromatic radical; "n" is an integer from 0-4; $R^9$ is independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; and "m" is an integer from 0 to 4. The carboxy-terminated oligomeric polyester is characterized by a ratio of carboxy end-groups to a total number of hydroxy end-groups and carboxy end-groups. The ratio is greater than about 70 percent. The component B comprises at least one "organic species" comprising one or more functional groups, the functional groups being chemically reactive with the carboxy end-groups of the oligomeric polyester of component A. The optional component C comprises one or more catalysts, which promote a chemical reaction between the carboxy end-groups of the oligomeric polyester of component A and the "organic species" of component B. The carboxy-terminated oligomeric polyester comprising structural units having formula X is prepared by a method comprising, heating a reaction mixture having at least one catalyst, at least one diacid, at least one diol, and at least one diaryl carbonate. The at least one diacid and the at least one diol are present in the reaction mixture in an amount corresponding to a molar ratio of diacid to diol such that between about 10% and about 40% excess diacid is used based on the amount of diol employed in the reaction. The at least one diacid is selected from the group consisting of diacids represented by structural formulae IV and V

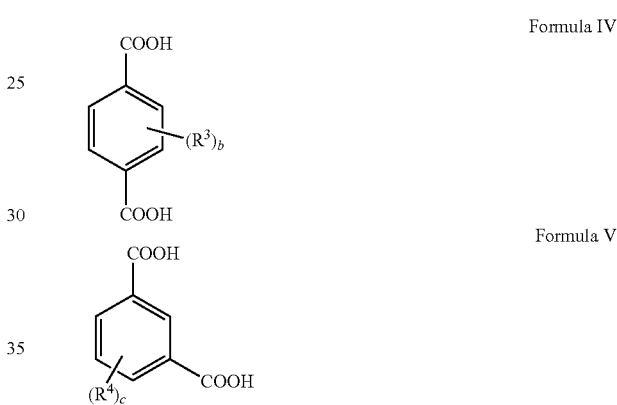

Formula IV

Formula V wherein $R^3$ and $R^4$ are independently at each occurrence a halogen atom, a nitro group, a cyano group, a $C_1$-$C_{12}$ aliphatic radical, a $C_3$-$C_{12}$ cycloaliphatic radical, or a $C_3$-$C_{20}$ aromatic radical; "b" is an integer from 0 to 4; and "c" is an integer from 0-4. The at least one diol is represented by structural formula XI,

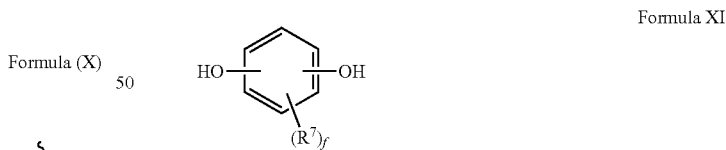

Formula XI wherein $R^7$ is independently at each occurrence a halogen atom, a nitro group, a cyano group, a $C_1$-$C_{14}$ aliphatic radical, a $C_4$-$C_{14}$ cycloaliphatic radical, or a $C_6$-$C_{14}$ aromatic radical; and "f" is an integer from 0 to 4. The diacid and diol are present in an amount corresponding to a molar ratio of diacid to diol in a range of from about 10% to about 40% excess diacid based on the amount of diol employed.

DETAILED DESCRIPTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

The modifier "about" used in connection with a quantity is inclusive of the stated value and has the meaning dictated by the context (e.g., includes the degree of error associated with measurement of the particular quantity).

As used herein the term "aliphatic radical" refers to an organic radical having a valence of at least one comprising a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl; difluorovinylidene; trichloromethyl, bromodichloromethyl, bromoethyl, 2-bromotrimethylene (e.g. $—CH_2CHBrCH_2—$), and the like. Further examples of aliphatic radicals include allyl, aminocarbonyl (i.e. $—CONH_2$), carbonyl, dicyanoisopropylidene (i.e. $—CH_2C(CN)_2CH_2—$), methyl (i.e. $—CH_3$), methylene (i.e. $—CH_2—$), ethyl, ethylene, formyl (i.e. $—CHO$), hexyl, hexamethylene, hydroxymethyl (i.e. $—CH_2OH$), mercaptomethyl (i.e. $—CH_2SH$), methylthio (i.e. $—SCH_3$), methylthiomethyl (i.e. $—CH_2SCH_3$), methoxy, methoxycarbonyl (i.e. $CH_3OCO—$), nitromethyl (i.e. $—CH_2NO_2$), thiocarbonyl, trimethylsilyl (i.e.$(CH_3)_3Si—$), t-butyldimethylsilyl, trimethyoxysilylpropyl (i.e. $(CH_3O)_3SiCH_2CH_2CH_2—$), vinyl, vinylidene, and the like. By way of further example, a $C_1$-$C_{10}$ aliphatic radical contains at least one but no more than 10 carbon atoms. A methyl group (i.e. $CH_3—$) is an example of a $C_1$ aliphatic radical. A decyl group (i.e. $CH_3(CH_2)_{10}—$) is an example of a $C_{10}$ aliphatic radical.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component $—(CH_2)_4—$. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as trifluoromethylphenyl, hexafluoroisopropylidenebis(4-phen-1-yloxy) (i.e. $—OPhC(CF_3)_2PhO—$), chloromethylphenyl; 3-trifluorovinyl-2-thienyl; 3-trichloromethylphen-1-yl (i.e. 3-$CCl_3$Ph-), 4(3-bromoprop-1-yl)phen-1-yl (i.e. $BrCH_2CH_2CH_2Ph-$), and the like. Further examples of aromatic radicals include 4-allyloxyphen-1-oxy, 4-aminophen-1-yl (i.e. $H_2NPh-$), 3-aminocarbonylphen-1-yl (i.e. $NH_2COPh-$), 4-benzoylphen-1-yl, dicyanoisopropylidenebis (4-phen-1-yloxy) (i.e. $—OPhC(CN)_2PhO—$), 3-methylphen-1-yl, methylenebis(phen-4-yloxy) (i.e. $OPhCH_2PhO—$), 2-ethylphen-1-yl, phenylethenyl, 3-formyl-2-thienyl, 2-hexyl-5-furanyl; hexamethylene-1,6-bis(phen-4-yloxy) (i.e. $—OPh(CH_2)_6PhO—$); 4-hydroxymethylphen-1-yl (i.e. 4-$HOCH_2Ph-$), 4-mercaptomethylphen-1-yl (i.e. 4-$HSCH_2Ph-$), 4-methylthiophen-1-yl (i.e. 4-$CH_3SPh-$), 3-methoxyphen-1-yl, 2-methoxycarbonylphen-1-yloxy (e.g. methyl salicyl), 2-nitromethylphen-1-yl (i.e. $—PhCH_2NO_2$), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2—$) represents a $C_3$ aromatic radical. The benzyl radical ($C_7H_8—$) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2—$) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene2,2-bis (cyclohex-4-yl) (i.e. —$C_6H_{10}C(CF_3)_2$ $C_6H_{10}$—), 2-chloromethylcyclohex-1-yl; 3-difluoromethylenecyclohex-1-yl; 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}$—), and the like. Further examples of cycloaliphatic radicals include 4-allyloxycyclohex-1-yl, 4-aminocyclohex-1-yl (i.e. $H_2N\ C_6H_{10}$—), 4-aminocarbonylcyclopent-1-yl (i.e. $NH_2COC_5H_8$—), 4-acetyloxycyclohex-1-yl, 2,2-dicyanoisopropylidenebis(cyclohex-4-yloxy) (i.e. —$OC_6H_{10}C(CN)_2C_6H_{10}O$—), 3-methylcyclohex-1-yl, methylenebis(cyclohex-4-yloxy) (i.e. —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (i.e. —$OC_6H_{10}(CH_2)_6C_6H_{10}O$—); 4-hydroxymethylcyclohex-1-yl (i.e. 4-$HOCH_2C_6H_{10}$—), 4-mercaptomethylcyclohex-1-yl (i.e. 4-$HSCH_2C_6H_{10}$—), 4-methylthiocyclohex-1-yl (i.e. 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e. $NO_2CH_2C_6H_{10}O$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}O$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{10}CH_2$—) represents a $C_7$ cycloaliphatic radical.

As used herein, the term "total number of end-groups" refers to the sum total of the end-groups present in the carboxy-terminated oligomeric polyester, wherein said end-groups comprise carboxy end-groups, hydroxy end-groups and phenoxy end groups.

As used herein, the term "oligomeric" refers to a polymer species having a weight average molecular weight in a range from about 500 grams per mole to 15,000 grams per mole as determined by gel permeation chromatography using polystyrene molecular weight standards.

In various embodiments the present invention provides a composition comprising at least one carboxy-terminated oligomeric polyester, the oligomeric polyester comprising structural units derived from at least one diacid, at least one diaryl carbonate, and at least one diol, wherein the structural units derived from the diacid are present in a molar excess of from about 10% to about 40% based on a ratio of moles of diacid-derived structural units to moles of diol-derived structural units present in said composition, said polyester being characterized by the presence of atleast some phenoxy groups.

The oligomeric polyester comprises structural units of formula I,

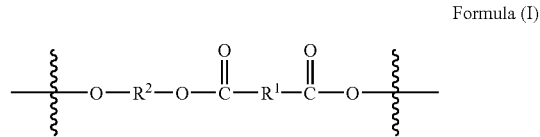

Formula (I)

wherein $R^1$ is independently at each occurrence a $C_1$-$C_{20}$ aliphatic radical, a $C_3$-$C_{20}$ cycloaliphatic radical, or a $C_3$-$C_{20}$ aromatic radical; and $R^2$ is independently at each occurrence a $C_1$-$C_{20}$ aliphatic radical, a $C_3$-$C_{20}$ cycloaliphatic radical, a $C_6$-$C_{20}$ aromatic radical, or a linking group having formula II,

Formula II wherein each $G^1$ is independently at each occurrence a $C_6$-$C_{20}$ aromatic radical; E is independently at each occurrence a bond, a $C_3$-$C_{20}$ cycloaliphatic radical, a $C_6$-$C_{20}$ aromatic radical, a $C_1$-$C_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero, wherein at least one of "t", "s" or "u" is not equal to zero. In one embodiment, each $G^1$ is 1,4-phenylene, E is isopropylidene, and "t", "s" and "u" are each 1 (e.g. formula II represents a bisphenol A residue). In an alternate embodiment $G^1$ is 1,3-phenylene, "t" is one and "s" and "u" are each 0 (e.g. formula II represents a resorcinol residue). Typically the weight average molecular weight (Mw) of the oligomeric polyester ranges from about 500 to about 15,000 grams per mole as measured by gel permeation chromatography using polystyrene molecular weight standards Suitable diacids include those represented by structural formula III,

Formula III wherein $R^1$ is a $C_1$-$C_{20}$ aliphatic radical, a $C_3$-$C_{20}$ cycloaliphatic radical, or a $C_3$-$C_{20}$ aromatic radical. Suitable diacids represented by formula III include decanedioic acid, undecanedioic acid, sebacic acid, adipic acid, suberic acid, oleic acid, azelaic acid, isophthalic acid, terephthalic acid, malonic acid, malic acid, maleic acid, lactic acid, naphthalene-2,6-dicarboxylic acid, naphthalene-2,7-dicarboxylic acid, cyclohexane-1,4-dicarboxylic acid, biphenyl-3,4'-dicarboxylic acid biphenyl-4,4'-dicarboxylic acid, diphenylether-4,4'-dicarboxylic acid, diphenylsulfone-4,4'-dicarboxylic acid, diphenylketone-4,4'-dicarboxylic acid, diphenylsulfide-4,4'-dicarboxylic acid, diphenylmethane-4,4'-dicarboxylic acid, diphenyldichloromethane-4,4'-dicarboxylic acid and mixtures thereof. In one particular embodiment the diacid comprises a mixture of diacids represented by structural formulae IV and V,

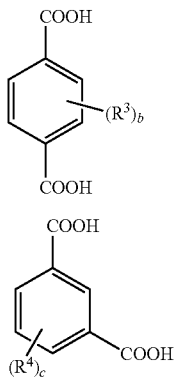

Formula IV

Formula V wherein $R^3$ and $R^4$ are independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; "b" is an integer from 0 to 4; and "c" is an integer from 0 to 4. Suitable diacids of formula IV include terephthalic acid, 2-nitro terephthalic acid, 2-iodo terephthalic acid, 3-chloroterephthalic acid and mixtures thereof. Suitable diacids of formula V include, isophthalic acid, 5-iodo-isophthalic acid, 5-methyl-isophthalic acid, 5-nitro-isophthalic acid and mixtures thereof. In one embodiment the diacid of formula IV is terephthalic acid. In one embodiment the diacid of formula V is isophthalic acid.

As noted, the compositions of the present invention comprise structural units derived from at least one diaryl carbonate. The structural units "derived from" the diaryl carbonate are of two types, terminal phenoxy groups which are invariably present in the carboxy-terminated oligomeric polyesters of the present invention, and the internal ester linkages (—O—CO—) of the carboxy-terminated oligomeric polyesters. Those skilled in the art will appreciate that the internal ester linkages of the product carboxy-terminated oligomeric polyesters while not containing structural units actually present in the diaryl carbonate, are nonetheless "derived from" the diaryl carbonate. Any diaryl carbonate may be employed according to the present invention. Typically, at least one diaryl carbonate is used which has formula VI

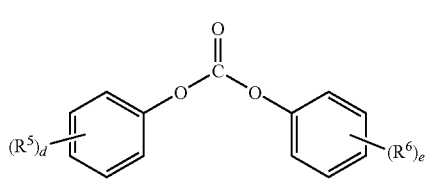

Formula VI wherein $R^5$ and $R^6$ are independently at each occurrence a halogen atom, a nitro group, a cyano group, a $C_1$-$C_{20}$ aliphatic radical, a $C_3$-$C_{20}$ cycloaliphatic radical, or a $C_3$-$C_{20}$ aromatic radical; "d" is an integer from 0 to 5; and "e" is an integer from 0 to 5. Suitable diaryl carbonates represented by formula VI include diphenyl carbonate, bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, and bis(methyl salicyl)carbonate. In one embodiment the diaryl carbonate has formula VII

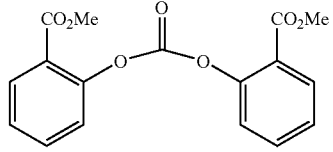

Formula VII also known as bis(methyl salicyl)carbonate.

In one embodiment, the oligomeric polyester composition comprises structural units derived from at least one diol having formula VIII, HO—$R^2$—OH      Formula VIII wherein $R^2$ is a $C_2$-$C_{20}$ aliphatic radical, a $C_4$-$C_{20}$ cycloaliphatic radical, a $C_6$-$C_{20}$ aromatic radical or a linking group having formula II

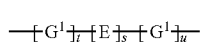

Formula II wherein each $G^1$ is independently at each occurrence a $C_6$-$C_{20}$ aromatic radical; E is independently at each occurrence a bond, a $C_3$-$C_{20}$ cycloaliphatic radical, a $C_6$-$C_{20}$ aromatic radical, a $C_1$-$C_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero, wherein at least one of t, s, and u is not equal to zero.

Suitable diols having formula VIII include1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis [3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbomane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl)acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3- methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{13}$ alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and mixtures thereof.

In one embodiment $R^2$ is an aromatic radical of formula IX

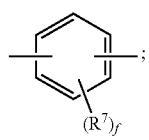

Formula IX wherein $R^7$ is independently at each occurrence a halogen atom, a nitro group, a cyano group, a $C_1$-$C_{14}$ aliphatic radical, a $C_4$-$C_{14}$ cycloaliphatic radical, or a $C_3$-$C_{14}$ aromatic radical; and "f" is an integer from 0 to 4. Suitable diols having structure VIII wherein the group $R^2$ has formula IX are illustrated by resorcinol, hydroquinone, methyl hydroquinone, 2-methyl resorcinol, 4-methyl resorcinol, 5-methyl resorcinol, hexyl hydroquinone, 2-butyl resorcinol, and the like. In a preferred embodiment the diol is resorcinol.

Typically, the structural units derived from the diacid are present in a molar excess corresponding to from about 10% to about 40% excess based on a ratio of moles of diacid-derived structural units to moles of diol-derived structural units present in the oligomeric polyester composition. In one embodiment structural units derived from the diacid are present in a molar excess of from about 15% to about 35% based on a ratio of moles of diacid-derived structural units to moles of diol-derived structural units present in the composition. In a preferred embodiment structural units derived from the diacid are present in a molar excess of from about 20% to about 30% based on a ratio of moles of diacid-derived structural units to moles of diol-derived structural units present in the composition. Without being bound to theory it is believe that the molar excess of the diacid controls the molecular weight of the ultimate polymer. The diacid is converted to the corresponding aryl ester with the diaryl carbonate. The aryl ester will transesterify with the diol to make the ester bond, forming the polymer. Free diacid acid (i.e. the diacid used in excess) will not enter into transesterification with diaryl carbonate, and so ends up on the ends of the polymer chain. Hence, if the excess of diacid is less than 10%, then the molecular weight of the final polymer may be too high to be of any utility and if it is more than 40%, the molecular weight may be too low to be useful.

The carboxy-terminated oligomeric polyester is further characterized by a ratio of carboxy end-groups to a total number of end-groups. Typically the ratio of carboxy end-groups to the total number of end-groups is greater than about 70%. In one embodiment the ratio of carboxy end-groups to the total number of end-groups is greater than about 80%, and in a preferred embodiment the ratio of carboxy end-groups to the total number end-groups is greater than about 90%. Typically the ratio of the atleast some phenoxy end groups ranges from about 5% to about 60% of the total number of end groups.

As noted, the present invention provides a method for the preparation of carboxy-terminated oligomeric polyesters. It has been discovered within the context of the present invention that excellent control over the molecular weight of the carboxy-terminated oligomeric polyester may be achieved when the oligomeric polyester is prepared in a reaction medium which is essentially homogeneous with respect to the organic reactants. Thus, in one aspect, the present invention provides a method for preparing carboxy-terminated oligomeric polyester of low molecular weight in a process in which reaction of one or more diol moieties with at least one diacid moiety is carried out under conditions which are essentially homogeneous with respect to the organic reactants.

In particular, the present invention provides method for preparing a composition comprising a carboxy-terminated oligomeric polyester, said method comprising heating a reaction mixture comprising at least one catalyst, at least one diacid, at least one diol, and at least one diaryl carbonate, wherein said at least one diacid, and said at least one diol, are present in an amount corresponding to a molar ratio of diacid to diol, said molar ratio being in a range between about 10% to about 40% excess diacid based on the amount of diol.

The method of the present invention may be used to prepare a wide variety of carboxy-terminated oligomeric polyesters of low varying molecular weight. By "low molecular weight" it is meant that the polyester has a weight average molecular weight (Mw) of about 500 to 15000 grams per mole as measured by gel permeation chromatography (GPC) using polystyrene (PS) molecular weight standards and is used interchangeably with the term "oligomeric". In a preferred embodiment the weight average molecular weight (Mw) of the carboxy-terminated oligomeric polyarylate is in a range from about 500 to about 10,000 grams per mole.

As noted, the method of the present invention may be used to prepare carboxy-terminated oligomeric polyesters comprises heating a reaction mixture comprising at least one diacid, at least one diol, and at least one diaryl carbonate, in the presence of at least one catalyst and optionally in the presence of a co-catalyst. Typically the molar ratio of diacid to diol is in a range corresponding to from about 10% to about 40% excess diacid based on the amount of diol employed in the reaction. More specifically the molar ratio of diacid to diol is in a range corresponding to from about 15% to about 35% excess diacid based on the amount of diol in the reaction mixture. In one particular embodiment the molar ratio of diacid to diol is in a range corresponding to from about 20% to about 30% excess diacid.

The at least one diaryl carbonate is employed in an amount such that the molar ratio of diaryl carbonate to diol is in a range from about 1.5 to 1 to about 2.5 to 1. In a particular embodiment the molar ratio of diaryl carbonate to diol is in a range from about 1.9 to 1 to about 2.03 to 1.

Typically, the temperature of the reaction mixture is in a range of from about 140 to about 300° C. In one embodiment the reaction mixture is heated to a temperature in a range from about 200 to 300° C. In a preferred embodiment the reaction mixture is heated to a temperature from about 260 to 265° C. It is believed that successful incorporation into the product oligomeric polyester of even higher levels of diacid may be achievable at higher temperatures.

The catalyst employed according to the method of the present invention is typically a Lewis acid catalyst. Preferably one or more transition metal alkoxide-type Lewis acid catalyst are utilized. Transition metal alkoxide-type Lewis acid catalysts have been shown to be more active in transesterification reactions as compared to basic catalysts.

Suitable catalysts used according to the method of the present invention include alkoxides of Group IVB metals and derivatives of Group IVA metals, metal oxides, and metal carboxylates. Additionally, suitable catalysts for use according to the method of the present invention include titanium butoxide (Ti(OBu)$_4$), titanium isopropoxide (Ti(OiPr)$_4$), titanium phenoxide (Ti(OPh)$_4$), antimony trioxide, zirconium butoxide (Zr(OBu)$_4$), dialkyltin dialkoxides, dibutyltin oxide, dibutyltin diesters, tin phenoxide, and the like. The use of a titanium compound such as titanium butoxide (Ti(OBu)$_4$), an antimony compound such as antimony trioxide or an organo tin compound such as dibutyltin oxide as catalyst is in certain embodiments especially preferred, since reaction rates are enhanced and the product oligomeric polyesters and compositions prepared from them having a satisfactory color tone can be obtained.

Typically, the amount of catalyst employed may be quite low and can range from about 20 parts per million (hereinafter referred to as ppm) to about 1000 ppm (metal with respect to the weight of the product oligomeric polyester). Preferably the catalyst is employed in an amount corresponding to from about 20 ppm to about 500 ppm metal with respect to the weight of the product oligomeric polyester, with a range from about 25 ppm to about 500 ppm being most preferred.

In general, the diol, the diacid and the diaryl carbonate are added to a reactor in combination with the catalyst to produce the desired carboxy-terminated oligomeric polyester.

As the metal alkoxide catalyst may impart an orange or yellow color to the resulting polymer, a co-catalyst selected from the group of alkali metal phosphate, alkali metal phosphite, alkali metal hypophosphite or alkali metal polyphosphate may optionally be included to increase the rate of the reaction. Typically the co-catalyst is added at the end of the end of the reaction.

The alkali metal phosphate can be a phosphate salt containing one, two, or three alkali metal groups; the alkali metal phosphite can be a phosphite salt containing one or two alkali metal groups; the alkali metal hypophosphite can be a hypophosphite salt containing any number of alkali metal groups; and the alkali metal polyphosphate can be a polyphosphate salt containing one, two, three, four, or five alkali metal groups. The co-catalyst not only increases the reaction rate in the production of the desired oligomeric polyester, it also improves the color of the resulting product. Preferably, the co-catalyst is an alkali metal phosphate, with sodium dihydrogen phosphate being most preferred.

The amounts of the co-catalyst may vary, with the molar ratio of co-catalyst to catalyst ranging from about 2:1 to about 10:1, preferably from about 3:1 to about 6:1, most preferably at a ratio of about 4:1. Attenuation of the undesired color indicates a reduction in the amount of undesired side reaction product.

In addition, where a titanium catalyst is used any discoloration of the final product due to the formation of aromatic titanates can be minimized using a catalyst quencher (e.g., phosphoric acid, phosphorous acid, organic phosphites, etc.). It is possible that one skilled in the art may vary the temperature and amount of catalyst, to achieve higher levels of diacid, based on the amount of diol in the composition.

Typically, the polymerization reaction is carried out in two stages. In the first stage of the reaction, the starting materials are added to the reactor, heated, and the reaction is allowed to proceed until the pre-polymer clarifies (sometimes referred to herein as clearing). During the second stage of the reaction (after clearing), the temperature of the reactor is either maintained or reduced and a vacuum is then slowly applied to remove by-products, which are primarily phenols.

The temperature of the first stage of the reaction may range from about 140° to about 300° C. or higher, with a temperature of from about 260° to about 290° C. being preferred. The temperature of the second stage of the reaction can range from about 240° C. to about 320° C., preferably from about 260 to about 300° C., with a temperature of from about 270° C. to about 290° C. being most preferred.

Reaction times for the first stage may vary from about 25 minutes to about 400 minutes, preferably from about 45 to about 300 minutes and more preferably from about 45 to about 150 minutes. Reaction times for the second stage may vary from about 60 minutes to about 300 minutes, preferably from about 100 to about 240 minutes. As can be appreciated by one skilled in the art, the reaction time will vary depending upon such factors as the form of the polymer, temperature, etc.

The first stage of the polymerization reaction is generally conducted at atmospheric pressure. The second stage of the reaction is conducted at a pressure ranging from about 60 mbar to 0.01 mbar, with a range of from about 1 mbar to about 0.02 mbar being preferred. This assists in driving away the by-products.

In some embodiments, the reaction mixture giving rise to the product carboxy-terminated oligomeric polyester is subjected to a purge with an inert gas such as nitrogen or argon in an amount ranging from about 0.1 liters/min to about 10 liters/min during the polymerization reaction, preferably about 0.5 liter/min, in order to reduce any discoloration as a result of thermal oxidation during the polymerization process.

In one embodiment, the diol utilized is resorcinol and the diacid utilized is a mixture of isophthalic and terephthalic acids; and the diaryl carbonate utilized is diphenyl carbonate. The resulting carboxy-terminated oligomeric polyester diacid can be used to prepare compositions having both excellent thermal and UV stability.

In one aspect the invention provides a carboxy-terminated oligomeric polyester. The oligomeric polyester is characterized by a ratio of carboxy end-groups to a total number of end-groups. The ratio is typically greater than about 70 percent.

In certain embodiments the carboxy-terminated oligomeric polyester comprises structural units of formula X. In one particular embodiment "n" and "m" in formula X are zero.

As noted, in another aspect the present invention also provides a composition comprising components A, B and optionally C, wherein component A comprises at least one carboxy-terminated oligomeric polyester, said polyester comprising structural units of formula X, wherein the oligomeric polyester is characterized by a ratio of carboxy end-groups to a total number of end-groups, said ratio being greater than about 70 percent.

Component B comprises at least one organic species having one or more functional groups which may be the same or different, said functional groups being chemically reactive with the phenolic hydroxy groups of the oligomeric polyester of component A. While any functional group capable of reaction with the carboxy-terminal groups of the oligomeric polyester of component A may be employed, the functional groups of component B are typically selected from the group consisting of isocyanates, blocked isocyanates, anhydrides, epoxides, acid chlorides, carboxylic acids, activated carboxylic acid esters, sulfonyl chlorides, amidals, and aminals. In one embodiment, component B comprises at least one melanine-type resin, urea formaldehyde resin, or a combination thereof. In an alternative embodiment, component B comprises an aliphatic polyisocyanate. In one embodiment, component B comprises IPDI-Trimer (isocyanurate of isophorone diisocyanate, commercially known as VESTANAT T 1890). In another embodiment component B comprises epoxy resin precursor a polyglycidyl. In one embodiment component B comprises BPA diglycidyl ether (commercially known as EPON Resin 2002). Typically, the concentration of component B in the disclosed coating composition is in a range between about 1 and about 99 percent by weight of the total weight of the coating composition.

As noted, the composition may comprise a component C, a catalyst promotes the reaction between component A and component B. The presence of catalyst C is optional. Typically, the catalyst is selected from the group consisting of tertiary amines, quaternary ammonium salts, quaternary phosphonium salts, Lewis acids, and mixtures thereof. Typically, component C is present in an amount corresponding to between about 0.00001 and about 10 percent by weight of total weight the coating composition. In one embodiment benzyl trimethylammonium bromide (hereinafter sometimes designated as BTMAB) may be used as a catalyst.

As noted, in another aspect the present invention also provides a composition comprising reactions products of components A, B and optionally C; wherein A, B and C are as defined above.

In one embodiment the present invention provides a composition comprising components A, B and C which is a coating composition. The term "coating composition" means simply that the composition may be used as a coating, or may be used in the preparation of a coating. The coating compositions of the present invention may contain one or more co-resins. The term "co-resin" is used to designate a polymeric species which does not fall within the class of materials belonging to the "organic species" of component B because the co-resin does not possess functional groups capable of reaction with the hydroxy groups of component A under conditions typically used for the formation of a coating. The co-resin may have either high or low molecular weight as defined herein. Polymers which are especially well suited for use as co-resins include polycarbonates, polyesters, polyetherimides, polyphenylene ethers, addition polymers and the like. Polyesters are illustrated by poly(alkylene arenedioates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"). The poly(alkylene arenedioates), poly(ethylene terephthalate) and poly(1,4-butylene terephthalate) are especially preferred in certain coating applications. Suitable addition polymers include homopolymers and copolymers, especially homopolymers of alkenylaromatic compounds, such as polystyrene, including syndiotactic polystyrene, and copolymers of alkenylaromatic compounds with ethylenically unsaturated nitrites, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers. Addition polymers as used herein include polyacrylate homopolymers and copolymers including polymers comprising methacrylate-derived structural units.

The compositions disclosed herein may further comprise art-recognized additives including organic and inorganic pigments, dyes, impact modifiers, UV screeners, hindered amine light stabilizers, degassing agents, corrosion inhibitors, surface tension modifiers, flame retardants, organic and inorganic fillers, stabilizers and flow aids.

The coating compositions disclosed herein may be are highly versatile and may comprise a variety of formulation types. Thus, in one embodiment of the present invention the coating composition comprises an organic solvent making it suitable for solvent casting. In another embodiment the coating composition is an aqueous dispersion. In yet another embodiment, the coating composition of the present invention is a sold which has been ground to a fine powder which is substantially solvent free, for example a powder coating formulation.

Coatings prepared using the solvent-based coating compositions comprising a carboxy terminated oligomeric polyester of formula I or formula X, may be prepared through solution coating followed by evaporation and curing. The solvent based coating formulations may be prepared and dissolved in suitable solvents for solvent casting. Typically dimethylacetamide and tetrahydrofuran or a mixture thereof are preferred solvents. However other co-solvents, such as amides (dimethylformamide, methyl pyrolidone, etc), esters (ethyl acetate, butyl acetate, etc), ketones (acetone, methyl ethyl ketone, methyl iso-butyl ketone, etc), alcohols (methanol, ethanol, etc.) aromatics (toluene, xylene, etc.), halogenated solvents (dichloromethane, chloroform, etc.) and mixtures thereof may also be employed. The solutions of the coating compositions for solvent casting should be mixed thoroughly prior to film casting onto a substrate. In water-based coating compositions, the components A, B and optionally C are dispersed or dissolved in an aqueous phase, and the resultant dispersion or solution is used to prepare coatings.

Solid compositions comprising at least one carboxy terminated oligomeric polyester of formula I or formula X, possess particularly advantageous physical properties for use in powder coatings. As noted, oligomeric polyesters having low molecular weight may be prepared using the novel synthetic procedure disclosed herein which forms one aspect of the instant invention. It should be noted, that the novel process described in detail in preceding sections of this document may be used to prepare carboxy-terminated oligomeric polyesters which are in some instances crystalline oligomeric polyesters. In this respect, performance of dry powder coating formulations comprising oligomeric polyesters may be enhanced when the polyesters are in an amorphous rather than crystalline form. Thus in one embodiment, a crystalline oligomeric polyester is converted into an amorphous form for use in a coating formulation according to the present invention. In one embodiment, in order to suppress crystallinity, a crystalline oligomeric polyester is melt extruded in an extruder thereby producing an amorphous form of the oligomeric polyester.

Typically, the components of the powder coating compositions are ground to a powder for dry blending, and are subsequently dry blended to produce a blend. After dry blending, the blend is extruded, ground and sieved to prepare the powder coating formulation, which may be electrostatically deposited on the substrate to be coated to produce a coated substrate. Alternatively, the coating formulation may be "solvent cast", or applied as a dispersion in water on a substrate to produce a coated substrate. The coated substrate may then be cured at a particular temperature for a certain time, or the coated substrate may be subjected to curing under a "cure profile" in which the cure conditions such as temperature, time and the like are varied during the curing process. The properties exhibited by the coating depend on the curing conditions. The optimum curing temperature and time ranges may be determined using the conditions disclosed herein or alternatively curing conditions may be arrived at by screening a modest number of different curing conditions.

Coatings prepared from the coating compositions disclosed herein have outstanding physical properties which include scratch resistance, chemical resistance, hardness, toughness and weatherability. The chemical resistance, hardness, toughness and weatherability of the coatings prepared using the coating compositions disclosed herein are in many instances superior to coatings prepared using known coating formulations. In one aspect, the coatings prepared from the coating compositions of the present invention show enhanced photostability. Thus, when exposed to UV light, the polyester component of the subject coatings undergo photo-Fries reaction to generate hydroxybenzophenone structural units which serve to protect the coating from further photochemical reaction and degradation. The hydroxybenzophenone photoproducts effectively absorb light in the "near UV" range of the spectrum and enhanced photostability is conferred upon the coating thereby. In this manner it is believed that the coatings prepared using the coating compositions of the present invention produce coatings which exhibit enhanced more robust weatherability and increased toughness.

In another embodiment, the present invention provides a coated article comprising a substrate layer comprising at least one thermoplastic polymer, thermoset polymer, cellulosic material, glass, ceramic, or metal, and at least one coating layer thereon, said coating layer prepared using the coating compositions of the instant invention, said coating layer comprising structural units having formula I. Optionally, the coated articles may further comprise an interlayer, for example an adhesive interlayer, between any substrate layer and any thermally stable polymer coating layer. Coated articles of the invention include, but are not limited to, those which comprise a substrate layer and a coating layer comprising oligomeric polyester; those which comprise a substrate layer with a coating layer comprising oligomeric polyester on each side of said substrate layer; and those which comprise a substrate layer and at least one coating layer comprising oligomeric polyester with at least one interlayer between a substrate layer and a coating layer.

The coated articles produced using the coating compositions of the present invention typically have outstanding initial gloss, improved initial color, weatherability, impact strength, and resistance to organic solvents encountered in their final applications.

The material of the substrate layer in the articles of this invention may be at least one thermoplastic polymer, whether addition or condensation prepared. Condensation polymers include, but are not limited to, polycarbonates, particularly aromatic polycarbonates, polyphenylene ethers, polyetherimides, polyesters (other than those employed for the coating layer, as defined hereinafter), and polyamides. Polycarbonates and polyesters are frequently preferred.

Polyester substrates include, but are not limited to, poly (ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly (vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers still more preferably constitute the major proportion thereof.

The substrate layer in the coated articles of this invention may also comprise at least one of any thermoset polymer. Suitable thermoset polymer substrates include, but are not limited to, those derived from epoxies, cyanate esters, unsaturated polyesters, diallylphthalate, acrylics, alkyds, phenol-formaldehyde, novolacs, resoles, bismaleimides, PMR resins, melamine-formaldehyde, ureaformaldehyde, benzocyclobutanes, hydroxymethylfurans, and isocyanates. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In another embodiment the invention encompasses coated articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Coated articles encompassed by the invention also include those comprising at least one glass layer. Typically any glass layer is a substrate layer, although coated articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to the environment may exhibit tarnishing, corrosion, or other detrimental phenomena. Therefore, in another embodiment the invention encompasses coated articles comprising at least one metal layer as substrate layer. Representative metal substrates include those comprising steel, aluminum, brass, copper, and other metals or metal-containing articles, which may require protection from the environment. Depending upon the nature of coating and metal layers, at least one adhesive interlayer may be beneficially employed between any metal layer and any thermally stable polymer coating layer.

The articles of this invention are characterized by the usual beneficial properties of the substrate layer, in addition to weatherability as evidenced by improved resistance to ultraviolet radiation and maintenance of gloss, and solvent resistance.

Coated articles which can be made which comprise thermally stable polymers comprising carboxy-terminated oligomeric polyester include automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted. articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

EXPERIMENTAL SECTION

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in °C.

$^1$H-NMR analyses were conducted on a Varian Gemini 400 MHz NMR spectrometer using DMSO-$d_6$ as solvent. Molecular weights are reported as weight average ($M_w$) molecular weight and were determined by gel permeation chromatography (GPC) analysis on a HP1100 HPLC using a PL-Gel Minimix-C column and chloroform as solvent, using a polystyrene molecular weight standard to construct a broad standard calibration curve against which polymer molecular weights were determined. The temperature of the gel permeation columns was about 25° C. and the mobile phase was chloroform.

Examples 1-10

Typical polymerization reaction was carried out as described below. The results of the examples 1-8 are tabulated in Table I below.

A round bottom wide-neck glass reactor (250 milliliters volume) was charged with: 10.798 g of terephthalic acid, 10.798 g of isophthalic acid, 11.011 g of resorcinol, 40.690 g of diphenyl carbonate, 21 mg of titanium tetrabutoxide (100 ppm) and 35 mg of NaH$_2$PO$_4$. The reactor was closed with a three-neck flat flange lid equipped with a mechanical stirrer and a torque meter. The lid was then heated to a temperature of 160° C. with a heating band. The system was then connected to a liquid nitrogen cooled condenser and immersed in a thermostated oil-bath at the temperature of 290° C. (temperature of the oil bath) (initial time, $t_0$). An argon flow (0.5 l·min$^{-1}$) was used. The first stage of the polymerization was carried out at 290° C., at atmospheric pressure under stirring (50 rpm). The phenol formed during the reaction was distilled off the reactor and recovered in the condenser. Carbon-dioxide evolution started after about 15 minutes. The system reached the clearing point after 45 minutes from the start of the reaction. The system was maintained for a time period of 180 minutes from the clearing time and then vacuum was slowly and carefully applied decreasing the internal pressure from atmospheric to 60 millibar in approximately 10 minutes. After another 30 minutes the internal pressure was decreased to 0.1 millibar and the reaction was terminated after 30 minutes at this pressure.

TABLE 1

| | Reactants | | | Reaction Parameters | | | |
|---|---|---|---|---|---|---|---|
| Example No. | (TPA + IPA)/ RES | DPC/ RES | TBT Catalyst (ppm). | Reaction Temperature | Clearing Time | Time after clear | Time at full vacuum |
| 1 | 1.1 | 2.03 | 200 | 260° C. | 60 min | 180 min | 30 min |
| 2 | 1.1 | 2.03 | 200 | 260° C. | 60 min | 180 min | 45 min |
| 3 | 1.2 | 2.03 | 150 | 260° C. | 90 min | 180 min | 45 min |
| 4 | 1.3 | 2.03 | 200 | 275° C. | 40 min | 240 min | 15 min |
| 5 | 1.3 | 1.9 | 200 | 275° C. | 90 min | 300 min | 15 min |
| 6 | 1.3 | 1.9 | 100 | 290° C. | 45 min | 180 min | 30 min |
| 7 | 1.3 | 1.85 | No cat | 290° C. | 300 min | 360 min | 30 min |
| 8 | 1.3 | 1.8 | 100 | 305° C. | 45 min | 180 min | 15 min |

TABLE 1-continued

| | | | | | | | |
|---|---|---|---|---|---|---|---|
| 9 | 1.4 | 1.9 | 50 | 290° C. | 60 min | 180 min | 15 min |
| 10 | 1.45 | 1.95 | 50 | 290° C. | 90 min | 180 min | 15 min |

| | <sup>1</sup>H-NMR results | | | | Moleuclar |
|---|---|---|---|---|---|
| Example | Carboxy endgroups | Hydroxdy endgroups | phenyl ester end groups | Free TPA | weightr (GPC) |
| 1 | 29% | 12% | 59% | 0.4% | 2740 |
| 2 | 10% | 2% | 88% | 0.1% | 4070 |
| 3 | 18% | 4% | 78% | 0.1% | 4420 |
| 4 | 54% | 3% | 43% | 0.8% | 4400 |
| 5 | 69% | 9% | 22% | 1.0% | 4400 |
| 6 | 82% | 4% | 14% | 0.9% | 7000 |
| 7 | 29% | 24% | 47% | 0.5% | 1600 |
| 8 | 76% | 11% | 12% | 1.1% | 7580 |
| 9 | 85% | 6% | 8% | 1.2% | 8120 |
| 10 | 90% | 4% | 5% | 0.9% | 9300 |

"TPA" = terephthalic acid, "IPA" = isophthalic acid, "TBT" = tetrabutyl titanate, "RES" = resorcinol The results in Table 1 show that, a high carboxylic end-group content was obtained when a 30% excess of phthalic acid with respect to resorcinol was used. Moreover lowering of the ratio of diphenyl carbonate to resorcinol to 1.9 helped reduce the content of phenyl ester end-groups below 25%. The use of a reaction temperature of 290° C. further reduced the level of phenyl ester end groups below 15%. In addition to that, lower amount of catalyst was used when higher reaction temperature was employed, which helped to reduce discoloration of the product carboxy-terminated oligomeric polyester. The use of higher reaction temperature also allowed the use of higher phthalic acids excess up to 1.45. The use of this amount of phthalic acids gives rise to oligomers with 90% carboxylic end-groups. Example 7 in the table indicates that it is possible to obtain the carboxy-terminated oligomeric polyesters without the use of a catalyst. However, in this case, very long reaction times are required (11.5 hours).

The invention has been described in detail with particular reference to preferred embodiments thereof, but it will be understood by those skilled in the art that variations and modifications can be effected within the spirit and scope of the invention.

What is claimed is:

1. A method for preparing a composition comprising a carboxy-terminated oligomeric polyester, said method comprising heating a reaction mixture to a temperature in a range from about 140 to 300° C., said reaction comprising
   a transition metal alkoxide Lewis acid catalyst;
   a diacid selected from the group consisting of diacids of formula IV and formula V

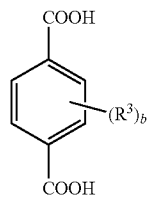

Formula IV

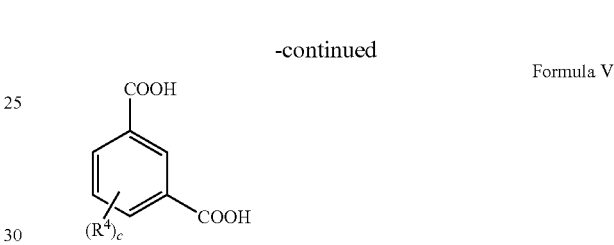

Formula V wherein, $R^3$ and $R^4$ are independently at each occurrence a halogen atom, a nitro group, a cyano group, a $C_1$-$C_{12}$ aliphatic radical, a $C_3$-$C_{12}$ cycloaliphatic radical, or a $C_3$-$C_{12}$ aromatic radical; "b" is an integer from 0 to 4; and "c" is an integer from 0 to 4;
   a diol having formula VIII

Formula VIII wherein $R^2$ is an aromatic radical of formula IX

Formula IX wherein $R^7$ is independently at each occurrence a halogen atom, a nitro group, a cyano group, a $C_1$-$C_{14}$ aliphatic radical, a $C_4$-$C_{14}$ cycloaliphatic radical, or a $C_6$-$C_{14}$ aromatic radical; and "f" is an integer from 0 to 4; and
   a diaryl carbonate has formula VI

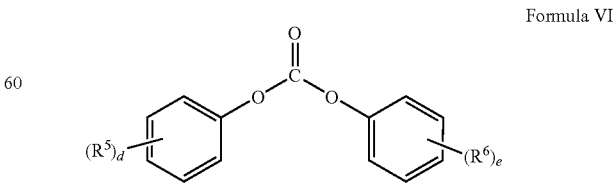

Formula VI wherein $R^5$ and $R^6$ are independently at each occurrence a halogen atom, a nitro group, a cyano group, $C_1$-$C_{20}$ aliphatic radical, $C_3$-$C_{20}$ cycloaliphatic radical, or a $C_6$-$C_{20}$ aromatic radical; "d" is an integer from 0 to 5; and "e" is an integer from 0 to 5; and wherein said diacid and said diol are present in an amount corresponding to a molar ratio of diacid to diol of between about 10% to about 40% excess diacid based on the amount of diol.

2. The method according to claim 1, wherein "b","c","d", "e", and "f" are zero.

3. The method according to claim 1 wherein said catalyst is titanium butoxide (Ti(OBu)$_4$), dicarboxylic acid is isophthalic and/or terephthalic acid, said diol is resorcinol, and said diaryl carbonate is diphenyl carbonate.

4. The method according to claim 3, wherein said reaction mixture further comprises sodium hydroxy phosphate co-catalyst.

5. The method according to claim 1 wherein said catalyst comprises a Group JYB metal alkoxides, a Group IVA metal oxide, a Group IVA metal carboxylate or antimony trioxide.

6. The method according to claim 1 wherein said catalyst is selected from the group consisting of titanium butoxide (Ti(OBu)$_4$), titanium isopropoxide (Ti(OiPr)$_4$), titanium phenoxide (Ti(OPh)$_4$), antimony trioxide, zirconium butoxide (Zr(OBu)$_4$), dialkyltin dialkoxides, dibutyltin oxide, dibutyltin diesters, and tin phenoxide.

7. The method according to claim 1 wherein said catalyst is titanium butoxide (Ti(OBu)$_4$).

8. The method according to claim 1 wherein said catalyst is present in an amount corresponding to from about 20 parts per million to about 1% based on the weight of diol employed.

9. The method according to claim 1 wherein said reaction mixture further comprises a co-catalyst, said co-catalyst comprising a metal hydroxy phosphate.

10. The method according to claim 9, wherein said co-catalyst comprises sodium hydroxy phosphate.

11. The method according to claim 9, wherein said co-catalyst is present in a molar ratio ranging from about 2:1 to about 10:1 based on the moles of catalyst employed.

12. The method according to claim 1 wherein said at least one diaryl carbonate and at least one diol are present in an amount corresponding to a molar ratio of diaryl carbonate to diol, said molar ratio of diaryl carbonate to diol being in a range between about 1.5 to 1 to about 2.5 to 1.

* * * * *